United States Patent
Turgeman et al.

(10) Patent No.: US 11,250,435 B2
(45) Date of Patent: *Feb. 15, 2022

(54) CONTEXTUAL MAPPING OF WEB-PAGES, AND GENERATION OF FRAUD-RELATEDNESS SCORE-VALUES

(71) Applicant: BioCatch Ltd., Tel Aviv (IL)

(72) Inventors: Avi Turgeman, Cambridge, MA (US); Oren Kedem, Tel Aviv (IL)

(73) Assignee: BIOCATCH LTD., Tel Aviv (IL)

( * ) Notice: Subject to any disclaimer, the term of this patent is extended or adjusted under 35 U.S.C. 154(b) by 56 days.

This patent is subject to a terminal disclaimer.

(21) Appl. No.: 16/822,015

(22) Filed: Mar. 18, 2020

(65) Prior Publication Data

US 2020/0234306 A1  Jul. 23, 2020

Related U.S. Application Data

(63) Continuation of application No. 15/194,593, filed on Jun. 28, 2016, now Pat. No. 10,621,585, which is a
(Continued)

(51) Int. Cl.
*G06Q 20/40* (2012.01)
*H04L 29/06* (2006.01)
(Continued)

(52) U.S. Cl.
CPC ......... *G06Q 20/4016* (2013.01); *G06F 21/31* (2013.01); *G06F 21/316* (2013.01);
(Continued)

(58) Field of Classification Search
CPC ... G06Q 20/4016; G06F 21/31; G06F 21/316; G06F 21/32; G06F 21/552; G06F 21/554;
(Continued)

(56) References Cited

U.S. PATENT DOCUMENTS 3,618,019 A  11/1971  Nemirovsky
3,699,517 A  10/1972  Dyche
(Continued)

FOREIGN PATENT DOCUMENTS

EP  2410450 A1  1/2012
EP  2477136 A1  7/2012
(Continued)

OTHER PUBLICATIONS

International Search Report for PCT international application PCT/IL2018/051246, dated Mar. 11, 2019.
(Continued)

*Primary Examiner* — Ashokkumar B Patel
*Assistant Examiner* — William B Jones
(74) *Attorney, Agent, or Firm* — Eitan Mehulal Sadot (57) ABSTRACT

Devices, systems, and methods of contextual mapping of web-page elements and other User Interface elements, for the purpose of differentiating between fraudulent transactions and legitimate transactions, or for the purpose of distinguishing between a fraudulent user and a legitimate user. User Interface elements of a website or webpage or application or other computerized service, are contextually analyzed. A first User Interface element is assigned a low fraud-relatedness score-value, since user engagement with the first User Interface element does not create a security risk or a monetary exposure. A second, different, User Interface element is assigned a high fraud-relatedness score-value, since user engagement with the second User Interface element creates a security risk or a monetary exposure. The fraud-relatedness score-values are taken into account, together with user-specific behavioral characteristics, in order to determine whether to generate a possible-fraud notification, or as part of generating a possible-fraud score for a particular set-of-operations.

15 Claims, 2 Drawing Sheets

Related U.S. Application Data continuation-in-part of application No. 14/675,768, filed on Apr. 1, 2015, now Pat. No. 9,418,221, and a continuation-in-part of application No. 14/325,396, filed on Jul. 8, 2014, now abandoned, and a continuation-in-part of application No. 14/320,656, filed on Jul. 1, 2014, now Pat. No. 9,665,703, said application No. 14/325,396 is a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942.

(60) Provisional application No. 62/190,264, filed on Jul. 9, 2015, provisional application No. 61/843,915, filed on Jul. 9, 2013, provisional application No. 61/417,479, filed on Nov. 29, 2010.

(51) Int. Cl.
*G06F 21/31* (2013.01)
*G06F 21/55* (2013.01)
*G06F 21/32* (2013.01)

(52) U.S. Cl.
CPC ............ *G06F 21/32* (2013.01); *G06F 21/552* (2013.01); *G06F 21/554* (2013.01); *H04L 63/08* (2013.01); *H04L 63/1408* (2013.01); *H04L 63/1441* (2013.01); *G06F 2221/2133* (2013.01); *H04L 2463/144* (2013.01)

(58) Field of Classification Search
CPC ............. G06F 2221/2133; H04L 63/08; H04L 63/1441
See application file for complete search history.

(56) References Cited

U.S. PATENT DOCUMENTS

| | | |
|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Yamada |
| 5,999,162 A | 12/1999 | Takahashi |
| 6,202,023 B1 | 3/2001 | Hancock |
| 6,337,686 B2 | 1/2002 | Wong |
| 6,337,919 B1 | 1/2002 | Dunton |
| 6,442,692 B1 | 8/2002 | Zilberman |
| 6,572,014 B1 | 6/2003 | Lambert |
| 6,819,219 B1 | 11/2004 | Bolle |
| 6,836,554 B1 | 12/2004 | Bolle |
| 6,895,514 B1 | 5/2005 | Kermani |
| 6,931,131 B1 | 8/2005 | Becker |
| 6,938,061 B1 | 8/2005 | Rumynin |
| 6,938,159 B1 | 8/2005 | O'Connor |
| 6,957,185 B1 | 10/2005 | Labaton |
| 6,957,186 B1 | 10/2005 | Guheen |
| 6,983,061 B2 | 1/2006 | Ikegami |
| 7,092,926 B2 | 8/2006 | Cerrato |
| 7,130,452 B2 | 10/2006 | Bolle |
| 7,133,792 B2 | 11/2006 | Murakami |
| 7,139,916 B2 | 11/2006 | Billingsley |
| 7,158,118 B2 | 1/2007 | Liberty |
| 7,236,156 B2 | 6/2007 | Liberty |
| 7,245,218 B2 | 7/2007 | Ikehara |
| 7,366,919 B1 | 4/2008 | Sobel |
| 7,395,436 B1 | 7/2008 | Nemovicher |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami |
| 7,818,290 B2 | 10/2010 | Davis |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,170,953 B1 | 5/2012 | Tullis |
| 8,201,222 B2 | 6/2012 | Inoue |
| 8,244,211 B2 | 8/2012 | Clark |
| 8,285,658 B1 | 10/2012 | Kellas-Dicks |
| 8,417,960 B2 | 4/2013 | Takahashi |
| 8,433,785 B2 | 4/2013 | Awadallah |
| 8,449,393 B2 | 5/2013 | Sobel |
| 8,499,245 B1 | 7/2013 | Froment |
| 8,510,113 B1 | 8/2013 | Conkie |
| 8,548,208 B2 | 10/2013 | Schultz |
| 8,549,629 B1 | 10/2013 | Mccreesh |
| 8,555,077 B2 | 10/2013 | Davis |
| 8,621,209 B1 | 12/2013 | Johansson |
| 8,745,729 B2 | 6/2014 | Poluri |
| 8,788,838 B1 | 8/2014 | Fadell |
| 8,803,797 B2 | 8/2014 | Scott |
| 8,819,812 B1 | 8/2014 | Weber |
| 8,832,823 B2 | 9/2014 | Boss |
| 8,838,060 B2 | 9/2014 | Walley |
| 8,880,441 B1 | 11/2014 | Chen |
| 8,898,787 B2 | 11/2014 | Thompson |
| 8,938,787 B2 | 1/2015 | Turgeman |
| 8,941,466 B2 | 1/2015 | Bayram |
| 8,990,959 B2 | 3/2015 | Zhu |
| 9,069,942 B2 | 6/2015 | Turgeman |
| 9,071,969 B2 | 6/2015 | Turgeman |
| 9,154,534 B1 | 10/2015 | Gayles |
| 9,174,123 B2 | 11/2015 | Nasiri |
| 9,195,351 B1 | 11/2015 | Rosenberg |
| 9,203,860 B1 | 12/2015 | Casillas |
| 9,275,337 B2 | 3/2016 | Turgeman |
| 9,282,112 B2 | 3/2016 | Filatov |
| 9,301,140 B1 | 3/2016 | Costigan |
| 9,304,915 B2 | 4/2016 | Adams |
| 9,355,231 B2 | 5/2016 | Disraeli |
| 9,355,234 B1 | 5/2016 | Magi Shaashua |
| 9,418,221 B2 | 8/2016 | Turgeman |
| 9,430,629 B1 | 8/2016 | Ziraknejad |
| 9,450,971 B2 | 9/2016 | Turgeman |
| 9,477,826 B2 | 10/2016 | Turgeman |
| 9,483,292 B2 | 11/2016 | Turgeman |
| 9,526,006 B2 | 12/2016 | Turgeman |
| 9,529,987 B2 | 12/2016 | Deutschmann |
| 9,531,701 B2 | 12/2016 | Turgeman |
| 9,531,733 B2 | 12/2016 | Turgeman |
| 9,536,071 B2 | 1/2017 | Turgeman |
| 9,541,995 B2 | 1/2017 | Turgeman |
| 9,547,766 B2 | 1/2017 | Turgeman |
| 9,552,470 B2 | 1/2017 | Turgeman |
| 9,558,339 B2 | 1/2017 | Turgeman |
| 9,589,120 B2 | 3/2017 | Samuel |
| 9,621,567 B2 | 4/2017 | Turgeman |
| 9,626,677 B2 | 4/2017 | Turgeman |
| 9,654,485 B1 | 5/2017 | Neumann |
| 9,665,703 B2 | 5/2017 | Turgeman |
| 9,674,218 B2 | 6/2017 | Turgeman |
| 9,690,915 B2 | 6/2017 | Turgeman |
| 9,703,953 B2 | 7/2017 | Turgeman |
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,838,373 B2 | 12/2017 | Turgeman |
| 9,848,009 B2 | 12/2017 | Turgeman |
| 9,927,883 B1 | 3/2018 | Lin |

(56) References Cited

U.S. PATENT DOCUMENTS

| | | |
|---|---|---|
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 10,404,729 B2 | 9/2019 | Turgeman |
| 10,474,815 B2 | 11/2019 | Turgeman |
| 10,476,873 B2 | 11/2019 | Turgeman |
| 10,523,680 B2 | 12/2019 | Turgeman |
| 10,579,784 B2 | 3/2020 | Turgeman |
| 10,586,036 B2 | 3/2020 | Turgeman |
| 10,621,585 B2 | 4/2020 | Turgeman |
| 2001/0004733 A1 | 6/2001 | Eldering |
| 2002/0023229 A1 | 2/2002 | Hangai |
| 2002/0089412 A1 | 7/2002 | Heger |
| 2003/0033526 A1 | 2/2003 | French |
| 2003/0074201 A1 | 4/2003 | Grashey |
| 2003/0137494 A1 | 7/2003 | Tulber |
| 2003/0149803 A1 | 8/2003 | Wilson |
| 2003/0212811 A1 | 11/2003 | Thornton |
| 2004/0015714 A1 | 1/2004 | Abraham |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall |
| 2004/0123156 A1 | 6/2004 | Hammond |
| 2004/0128240 A1 | 7/2004 | Yusin |
| 2004/0143737 A1 | 7/2004 | Teicher |
| 2004/0186882 A1 | 9/2004 | Ting |
| 2004/0221171 A1 | 11/2004 | Ahmed |
| 2005/0008148 A1 | 1/2005 | Jacobson |
| 2005/0060138 A1 | 3/2005 | Wang |
| 2005/0179657 A1 | 8/2005 | Russo |
| 2005/0289264 A1 | 12/2005 | Illowsky |
| 2006/0006803 A1 | 1/2006 | Huang |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham |
| 2006/0215886 A1 | 9/2006 | Black |
| 2006/0224898 A1 | 10/2006 | Ahmed |
| 2006/0238490 A1 | 10/2006 | Stanley |
| 2006/0280339 A1 | 12/2006 | Cho |
| 2006/0282660 A1 | 12/2006 | Varghese |
| 2006/0284969 A1 | 12/2006 | Kim |
| 2007/0118804 A1 | 5/2007 | Raciborski |
| 2007/0156443 A1 | 7/2007 | Gurvey |
| 2007/0174082 A1 | 7/2007 | Singh |
| 2007/0183633 A1 | 8/2007 | Hoffmann |
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0241861 A1 | 10/2007 | Venkatanna |
| 2007/0250920 A1 | 10/2007 | Lindsay |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0068343 A1 | 3/2008 | Hoshino |
| 2008/0084972 A1 | 4/2008 | Burke |
| 2008/0091453 A1 | 4/2008 | Meehan |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1* | 7/2008 | Chao-Yu ............ H04L 63/1483 |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2008/0309616 A1 | 12/2008 | Massengill |
| 2009/0037983 A1 | 2/2009 | Chiruvolu |
| 2009/0038010 A1 | 2/2009 | Ma |
| 2009/0049555 A1 | 2/2009 | Cho |
| 2009/0089879 A1 | 4/2009 | Wang |
| 2009/0094311 A1 | 4/2009 | Awadallah |
| 2009/0132395 A1 | 5/2009 | Lam |
| 2009/0133106 A1 | 5/2009 | Bentley |
| 2009/0134972 A1 | 5/2009 | Wu, Jr. |
| 2009/0157792 A1 | 6/2009 | Fiatal |
| 2009/0172551 A1 | 7/2009 | Kane |
| 2009/0189736 A1 | 7/2009 | Hayashi |
| 2009/0199296 A1 | 8/2009 | Xie |
| 2009/0203355 A1 | 8/2009 | Clark |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0300589 A1 | 12/2009 | Watters |
| 2009/0303204 A1 | 12/2009 | Nasiri |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0097324 A1 | 4/2010 | Anson |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0225443 A1 | 9/2010 | Bayram |
| 2010/0245553 A1 | 9/2010 | Schuler |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0055077 A1 | 3/2011 | French |
| 2011/0063211 A1 | 3/2011 | Hoerl |
| 2011/0065504 A1 | 3/2011 | Dugan |
| 2011/0066682 A1 | 3/2011 | Aldunate |

(56) References Cited

U.S. PATENT DOCUMENTS

| | | |
|---|---|---|
| 2011/0102570 A1 | 5/2011 | Wilf |
| 2011/0105103 A1 | 5/2011 | Ullrich |
| 2011/0105859 A1 | 5/2011 | Popovic |
| 2011/0113388 A1 | 5/2011 | Eisen |
| 2011/0154273 A1 | 6/2011 | Aburada |
| 2011/0154497 A1 | 6/2011 | Bailey |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |
| 2011/0251823 A1 | 10/2011 | Davis |
| 2011/0271342 A1 | 11/2011 | Chung |
| 2011/0276414 A1 | 11/2011 | Subbarao |
| 2011/0300831 A1 | 12/2011 | Chin |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |
| 2012/0102551 A1 | 4/2012 | Bidare |
| 2012/0113061 A1 | 5/2012 | Ikeda |
| 2012/0123932 A1 | 5/2012 | LeCuyer |
| 2012/0124662 A1 | 5/2012 | Baca |
| 2012/0133055 A1 | 5/2012 | Machida |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0239557 A1 | 9/2012 | Weinflash |
| 2012/0246737 A1 | 9/2012 | Paxton |
| 2012/0252410 A1 | 10/2012 | Williams |
| 2012/0278804 A1 | 11/2012 | Narayanasamy |
| 2012/0284380 A1 | 11/2012 | Anderson |
| 2012/0297476 A1 | 11/2012 | Zeljkovic |
| 2013/0018796 A1 | 1/2013 | Kolhatkar |
| 2013/0024239 A1 | 1/2013 | Baker |
| 2013/0036416 A1 | 2/2013 | Raju |
| 2013/0061169 A1 | 3/2013 | Pearcy |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0109944 A1 | 5/2013 | Sparacino |
| 2013/0111586 A1 | 5/2013 | Jackson |
| 2013/0133055 A1 | 5/2013 | Ali |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar |
| 2013/0198832 A1 | 8/2013 | Draluk |
| 2013/0212674 A1 | 8/2013 | Boger |
| 2013/0237272 A1 | 9/2013 | Prasad |
| 2013/0239195 A1 | 9/2013 | Turgeman |
| 2013/0239206 A1 | 9/2013 | Draluk |
| 2013/0243208 A1 | 9/2013 | Fawer |
| 2013/0254642 A1 | 9/2013 | Seo |
| 2013/0282637 A1 | 10/2013 | Costigan |
| 2013/0288647 A1 | 10/2013 | Turgeman |
| 2013/0305357 A1 | 11/2013 | Ayyagari |
| 2013/0312097 A1 | 11/2013 | Turnbull |
| 2013/0335349 A1 | 12/2013 | Ferren |
| 2013/0346309 A1 | 12/2013 | Giori |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Barnhoefer |
| 2014/0082369 A1 | 3/2014 | Waclawsky |
| 2014/0111451 A1 | 4/2014 | Park |
| 2014/0114843 A1 | 4/2014 | Klein |
| 2014/0118520 A1 | 5/2014 | Slaby |
| 2014/0123275 A1 | 5/2014 | Azar |
| 2014/0143304 A1 | 5/2014 | Hegarty |
| 2014/0168093 A1 | 6/2014 | Lawrence |
| 2014/0196119 A1 | 7/2014 | Hill |
| 2014/0200953 A1* | 7/2014 | Mun ............... G06Q 40/08 705/7.28 |
| 2014/0223531 A1 | 8/2014 | Outwater |
| 2014/0244499 A1 | 8/2014 | Gruner |
| 2014/0250538 A1 | 9/2014 | Rapaport |
| 2014/0259130 A1 | 9/2014 | Li |
| 2014/0270571 A1 | 9/2014 | Dwan |
| 2014/0283059 A1 | 9/2014 | Sambamurthy |
| 2014/0283068 A1 | 9/2014 | Call |
| 2014/0289833 A1 | 9/2014 | Briceno |
| 2014/0310805 A1* | 10/2014 | Kandekar ............... G06F 21/32 726/19 |
| 2014/0317028 A1 | 10/2014 | Turgeman |
| 2014/0317726 A1 | 10/2014 | Turgeman |
| 2014/0317734 A1 | 10/2014 | Valencia |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman |
| 2015/0002479 A1 | 1/2015 | Kawamura |
| 2015/0012920 A1 | 1/2015 | De Santis |
| 2015/0062078 A1 | 3/2015 | Christman |
| 2015/0081549 A1 | 3/2015 | Kimberg |
| 2015/0091858 A1 | 4/2015 | Rosenberg |
| 2015/0094030 A1 | 4/2015 | Turgeman |
| 2015/0101031 A1 | 4/2015 | Harjanto |
| 2015/0128252 A1 | 5/2015 | Konami |
| 2015/0146945 A1 | 5/2015 | Han |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213245 A1 | 7/2015 | Tartz |
| 2015/0213246 A1 | 7/2015 | Turgeman |
| 2015/0213251 A1 | 7/2015 | Turgeman |
| 2015/0242601 A1 | 8/2015 | Griffiths |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0279155 A1 | 10/2015 | Chun |
| 2015/0310196 A1 | 10/2015 | Turgeman |
| 2015/0348038 A1 | 12/2015 | Femrite |
| 2015/0358317 A1 | 12/2015 | Deutschmann |
| 2016/0006800 A1 | 1/2016 | Summers |
| 2016/0012465 A1 | 1/2016 | Sharp |
| 2016/0034673 A1 | 2/2016 | Chandra |
| 2016/0042164 A1 | 2/2016 | Goldsmith |
| 2016/0048937 A1 | 2/2016 | Mathura |
| 2016/0055324 A1 | 2/2016 | Agarwal |
| 2016/0057623 A1 | 2/2016 | Dutt |
| 2016/0077620 A1 | 3/2016 | Choi |
| 2016/0087952 A1 | 3/2016 | Tartz |
| 2016/0109969 A1 | 4/2016 | Keating |
| 2016/0132105 A1 | 5/2016 | Turgeman |
| 2016/0155126 A1 | 6/2016 | D'Uva |

(56) References Cited

U.S. PATENT DOCUMENTS

| | | |
|---|---|---|
| 2016/0164905 A1 | 6/2016 | Pinney Wood |
| 2016/0164906 A1 | 6/2016 | Pinney Wood |
| 2016/0174044 A1 | 6/2016 | Jones |
| 2016/0179245 A1 | 6/2016 | Johansson |
| 2016/0182503 A1 | 6/2016 | Cheng |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulbert |
| 2016/0226865 A1 | 8/2016 | Chen |
| 2016/0241555 A1 | 8/2016 | Vo |
| 2016/0294837 A1 | 10/2016 | Turgeman |
| 2016/0300049 A1 | 10/2016 | Guedalia |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0328572 A1 | 11/2016 | Valacich |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |
| 2017/0054702 A1 | 2/2017 | Turgeman |
| 2017/0063858 A1 | 3/2017 | Bandi |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0127197 A1 | 5/2017 | Mulder |
| 2017/0140279 A1 | 5/2017 | Turgeman |
| 2017/0149958 A1 | 5/2017 | Xian |
| 2017/0154366 A1 | 6/2017 | Turgeman |
| 2017/0177999 A1 | 6/2017 | Novik |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364674 A1 | 12/2017 | Grubbs |
| 2017/0364919 A1 | 12/2017 | Ranganath |
| 2018/0012003 A1 | 1/2018 | Asulin |
| 2018/0012227 A1 | 1/2018 | Tunnell |
| 2018/0034850 A1 | 2/2018 | Turgeman |
| 2018/0095596 A1 | 4/2018 | Turgeman |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0160309 A1 | 6/2018 | Turgeman |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2018/0373780 A1 | 12/2018 | Pascarella |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0156034 A1 | 5/2019 | Kedem |
| 2019/0158535 A1 | 5/2019 | Kedem |
| 2019/0220863 A1 | 7/2019 | Novick |
| 2019/0236391 A1 | 8/2019 | Novik |
| 2019/0272025 A1 | 9/2019 | Turgeman |
| 2019/0342328 A1 | 11/2019 | Rivner |
| 2019/0342329 A1 | 11/2019 | Turgeman |
| 2020/0012770 A1 | 1/2020 | Turgeman |
| 2020/0045044 A1 | 2/2020 | Turgeman |
| 2020/0076816 A1 | 3/2020 | Turgeman |

FOREIGN PATENT DOCUMENTS

| | | |
|---|---|---|
| EP | 2541452 A1 | 1/2013 |
| EP | 2610776 A2 | 7/2013 |
| EP | 2646904 B1 | 8/2018 |
| EP | 3019991 B1 | 2/2019 |
| ES | 2338092 A1 | 5/2010 |
| WO | 2005099166 A2 | 10/2005 |
| WO | 2007146437 A2 | 12/2007 |
| WO | 2012/001697 A1 | 1/2012 |
| WO | 2012073233 A1 | 6/2012 |
| WO | 2013/161077 A1 | 10/2013 |
| WO | 2018/007821 A1 | 1/2018 |
| WO | 2018/007823 A1 | 1/2018 |
| WO | 2018/055406 A1 | 3/2018 |

OTHER PUBLICATIONS

Written Opinion of the International Searching Authority for PCT international application PCT/IL2018/051246, dated Mar. 11, 2019.

Written Opinion of the International Searching Authority for PCT international application PCT/IL2011/000907, dated Apr. 19, 2012.

Written Opinion of the International Searching Authority for PCT international application PCT/IB2014/062293, dated Oct. 1, 2014.

Written Opinion of the International Searching Authority for PCT international application PCT/IB2014/062941, dated Dec. 17, 2014.

Written Opinion of the International Searching Authority for PCT international application PCT/IB2016/054064, dated Jul. 9, 2015.

Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.

Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.

Machine translation of WO 2013/161077 A1, "Biometric authentication device, biometric authentication program, and biometric authentication method", Obtained on Jan. 24, 2020 from: https://patents.google.com/patent/WO2013161077A1/en?oq=JP2006277341A.

Oriana Riva et al., "Progressive authentication: Deciding when to authenticate on mobile phones", USENIX Security Symposium 2012.

Communication from the European Patent Office (EPO) in EP 14814408, dated Oct. 15, 2019.

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Supplementary European Search Report for U.S. Appl. No. 11/844,440 dated Nov. 17, 2017.

International Search Report for application PCT/IB2016/054064 dated Nov. 21, 2016.

International Search Report for application PCT/IB2014/062941 dated Dec. 17, 2014.

International Search Report for application PCT/IB2014/062293 dated Oct. 1, 2014.

International Search Report for application PCT/IL2011/000907 dated Apr. 19, 2012.

(56) References Cited

OTHER PUBLICATIONS

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.
Nance et al., "Virtual Machine Introspection", IEEE Security & Privacy, 2008.
Garfinkel and Rosenblum, "A virtual Machine Introspection-Based Architecture for Intrusion Detection.", 2003, Proc. Network and Distributed Systems Security Symp., The Internet Society, pp. 191-206.
Spafford et al., "Software Forensics: Can We Track Code to its Authors?", Feb. 1992, Computer Science Technical Report, Purdue e-Pubs, Report No. CSD-TR-92-010.
Tavis Ormandy, "An Empirical Study into the Security Exposure to Hosts of Hostile Virtualized Environments", retrieved from the Internet on May 3, 2017, from: http://taviso.decsystem.org/virtsec.pdf.
Zheng et al., "An Efficient User Verification System via Mouse Movements", Oct. 17-21, 2011, CCS'11, Chicago, Illinois.
Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.
Georgia Frantzeskou et al., "Identifying Authorship by Byte-Level N-Grams: The source Code Author Profile (SCAP) Method", Spring 2007, International Journal of Digital Evidence, vol. 6, issue 1.
Franklin et al., "Remote Detection of Virtual Machine Monitors with Fuzzy benchmarking", ACM SIGOPS Operating Systems Review, V42, Issue 3, Apr. 2008.
Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Ahmed et al., "A New Biometric Technology Based on Mouse Dynamics", Jul.-Sep. 2007, IEEE Transactions on Dependable and Secure Computing, vol. 4, No. 3, pp. 165-179.
Bailey, Kyle O., "Computer Based Behavioral Biometric Authentication Via Multi-Modal Fusion", Thesis, 2013, Air Force Insitute of Technology.
Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.
Todorov, "Optimality Principles in Sensorimotor Control (Review)", Sep. 2004, Nature Neuroscience 7, pp. 907-915.
Cleeff et al., "Security Implications of Virtualization: A Literature Study", Science and Engineering, 2009.
Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.
Ferrie Peter, "Attack on Virtual Machine Emulators", Symantec Technology Exchange, 2007.
Yampolskiy et al., "Behavioural Biometrics: a survey and classification", 2008, International Journal of Biometrics, vol. 1, No. 1, pp. 81-113.
Provos et al., 2007, "The Ghost in the Browser: Analysis of Web-based Malware".
Huang Yao-Wen et al., "Web application security assessment by fault injection and behavior monitoring", 2003, Proceedings of the 12th international conference on World Wide Web, ACM.
Ben Hansen, "The Blur Busters Mouse Guide", dated Feb. 1, 2014; printed from the Internet on Aug. 5, 2019 from: https://www.blurbusters.com/faq/mouse-guide/.
Chris Cain, "Analyzing Man-in-the-Browser (MITB) Attacks", dated Dec. 2014; downloaded from: the Internet on Aug. 5, 2019 from https://www.sans.org/reading-room/whitepapers/forensics/analyzing-man-in-the-browser-mitb-attacks-35687.

* cited by examiner

CONTEXTUAL MAPPING OF WEB-PAGES, AND GENERATION OF FRAUD-RELATEDNESS SCORE-VALUES

CROSS-REFERENCE TO RELATED APPLICATIONS

This application is a Continuation of U.S. Ser. No. 15/194,593, filed on Jun. 28, 2016, which is hereby incorporated by reference in its entirety. The above-mentioned U.S. Ser. No. 15/194,593 claims priority and benefit from U.S. Ser. No. 62/190,264, filed on Jul. 9, 2015, which is hereby incorporated by reference in its entirety.

The above-mentioned U.S. Ser. No. 15/194,593 is a Continuation-in-Part (CIP) of U.S. Ser. No. 14/675,768, filed on Apr. 1, 2015, now patent number U.S. Pat. No. 9,418,221 (issued on Aug. 16, 2016), which is hereby incorporated by reference in its entirety.

The above-mentioned U.S. Ser. No. 15/194,593 is a Continuation-in-Part (CIP) of U.S. Ser. No. 14/320,656, filed on Jul. 1, 2014, now patent number U.S. Pat. No. 9,665,703 (issued on May 30, 2017), which is hereby incorporated by reference in its entirety.

The above-mentioned U.S. Ser. No. 15/194,593 is a Continuation-in-Part (CIP) of U.S. Ser. No. 14/325,396, filed on Jul. 8, 2014, which is hereby incorporated by reference in its entirety.

The above-mentioned U.S. Ser. No. 14/325,396 claims priority and benefit from U.S. Ser. No. 61/843,915, filed on Jul. 9, 2013, which is hereby incorporated by reference in its entirety.

The above-mentioned U.S. Ser. No. 14/325,396 is a Continuation-in-Part (CIP) of U.S. Ser. No. 13/922,271, filed on Jun. 20, 2013, now patent number U.S. Pat. No. 8,938,787 (issued on Jan. 20, 2015), which is hereby incorporated by reference in its entirety.

The above-mentioned U.S. Ser. No. 14/325,396 is a Continuation-in-Part (CIP) of U.S. Ser. No. 13/877,676, filed on Apr. 4, 2013, now patent number U.S. Pat. No. 9,069,942 (issued on Jun. 30, 2015); which is a National Stage of PCT International Application number PCT/IL2011/000907, filed on Nov. 29, 2011, published as International Publication number WO 2012/073233 A1; which claims priority and benefit from U.S. 61/417,479, filed on Nov. 29, 2010; and all the above-mentioned patent applications and patents are hereby incorporated by reference in their entirety.

FIELD

The present invention is related to the field of security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for contextual mapping and/or contextual analysis of web-pages or websites or applications, as well as generating fraud-relatedness score-values which may then be utilized for estimating or determining a possible-fraud score, or for determining whether a transaction or a set-of-operations is estimated to be fraudulent.

The present invention may include devices, systems, and methods of contextual mapping of web-page elements and other User Interface elements, for the purpose of differentiating between fraudulent transactions and legitimate transactions, or for the purpose of distinguishing between a fraudulent user and a legitimate user. For example, User Interface elements of a website or webpage or application or other computerized service, are contextually analyzed. A first User Interface element is assigned a low fraud-relatedness score-value, since user engagement with the first User Interface element does not create a security risk or a monetary exposure. A second, different, User Interface element is assigned a high fraud-relatedness score-value, since user engagement with the second User Interface element creates a security risk or a monetary exposure. The fraud-relatedness score-values are taken into account, together with user-specific behavioral characteristics, in order to determine whether to generate a possible-fraud notification, or as part of generating a possible-fraud score for a particular set-of-operations.

The present invention may provide other and/or additional benefits or advantages.

DETAILED DESCRIPTION OF THE PRESENT INVENTION

Some embodiments of the present invention may comprise systems, devices, and methods for automatic or automated or autonomous mapping of contextual properties of website components or webpage components (or application components, or User Interface (UI) components, or Graphical UI (GUI) components), for security purposes and/or for fraud-detection purposes and/or for fraud mitigation purposes and/or for risk assessment purposes.

The terms "webpage" or "web-page" as used herein may optionally comprise, for example, an entire website or Internet domain (e.g., www.Example.com); an entire sub-domain (e.g., Mobile.Example.com); a portion of a website, a portion of a domain, a portion of a sub-domain; a group or set or batch of inter-related web-pages; a group or set or batch of web-pages; a series of web-pages that are typically accessed from the same domain or that are hosted under the same domain, or that are co-hosted on the same server or a co-located server; a frame or a portion within a webpage; a content of web-page as displayed or presented via a web browser; the source code of a web-page; content of a web-page; an application or a mobile application or "app"; a page or form or tab that is part of a web-page or web-site or "app" or application; and/or other suitable structure.

The Applicants have realized that the interactions of a user with a computerized service (e.g., a website or an online service), may be monitored, logged and tracked in order to detect user-specific characteristics that may enable the system to differentiate among users, or that may enable the system to differentiate between a legitimate user (e.g., a genuine user who is the account-owner, an authorized user) and an attacker (or impersonator or "fraudster" or imposter or impostor or other illegitimate user).

The Applicants have further realized that the process of reaching a determination of fraud or non-fraud (or, the process of generating a fraud-possibility score or indicator), with regard to a particular transaction or operation, may comprise taking into account the Context of the operation or transaction being performed and/or the UI or GUI elements or the steps that are being utilized for performing the transaction.

For example, a user-behavior characteristic that indicates possible fraud, may not be sufficient to generate a fraud notification if the user is merely browsing the website and viewing the account balance; but he same or a similar user-specific behavioral characteristics may be sufficient for generating a fraud notification if the user engages in higher-risk or increased-risk or high-risk activity or operation (e.g., the user is submitting a command to wire funds from the logged-in account to a different account or to a third-party beneficiary).

Accordingly, the present invention may perform automatic scanning and mapping of the website (or webpage, or application, or service) that is being protected or being monitored or that is expected or intended to be monitored for fraudulent activity. The mapping process may identify UI elements or GUI elements (e.g., buttons, drop-down menus, selection boxes, data fields) and other elements (e.g., entire page or web-page; a tab or area in a website; a tab or area in a webpage; a tab or area in an application; an entire form; a sequence of operations or forms or pages), and may further classify or categorize or map such elements based on their context, based on their associated risk potential, or based on the level of damage that may occur if such element is fraudulently utilized, or based on the level of sufficiency of possible-fraud that would be required in order to trigger a fraud notification.

In some implementations, an automatic or semi-automatic Contextual Mapping Module may examine elements, forms, pages, fields, UI elements, GUI elements, text items, images, animations, video segments, audio segments, and/or other components of a website or webpage or application or service that is being protected against fraud (or that the system is preparing towards fraud protection). The Contextual Mapping Module may automatically identify and/or classify such elements as high-risk elements, low-risk elements, and/or other suitable risk-related classifications (e.g., medium-risk elements, risk-natural elements, no-risk elements, unknown-risk-level elements, increased risk-level elements, reduced risk-level elements).

The contextual mapping information of such elements may be stored in a lookup table or database or other data-structure, or as a fraud risk-level parameter associated with each element; and may subsequently be utilized as a factor or a parameter in the process of determining whether or not an operation or a transaction (or a set of operations) is fraudulent or legitimate, or in the process of assigning or generating a total fraud-possibility score for a transaction or for on operation or set of operations.

In a demonstrative implementation, the Contextual Mapping Module may identify or may isolate UI elements (e.g., a "submit" button, or a free-text field); and may assign a risk-level or a security-importance level or a security-exposure level associated with each such element. For example, the Contextual Mapping Module may detect a "submit wire transfer command" button on a "submit wire transfer" page or form or tab, and may assign High Risk indicator to that UI element and/or to UI elements that are located on the same page, and/or to user-operations that would be performed by utilizing that UI element or in relation to the page (or form) in which the UI element is located.

In contrast, the Contextual Mapping Module may detect a more "benign" UI element or form or page or website-element, such as a "Show Frequently Asked Questions (FAQ)" link or button, or a "Find Branch Location" button or link or form, that are generally associated with reduced risk or reduced exposure (or, no security risk, or no security exposer), and may tag or map them accordingly as reduced-risk or low-risk elements or pages or forms.

In some embodiments, the Contextual Mapping Module may tag or map or assign exposure values or fraud-relatedness values to such elements in an automatic or semi-automatic manner, and not manually and not by depending on manual (human) review of each element. For example, the Contextual Mapping Module may take into account certain keywords or words or terms in order to classify or tag such UI elements, and may compare the text or content of such UI elements to a pre-defined list of high-risk terms and/or to a pre-defined list of low-risk terms. For example, "wire" or "transfer" or "wire funds" or "wire transfer" may trigger higher-risk tagging; whereas "Contact Us" or "F.A.Q." or "Branch Locations" may trigger lower-risk tagging; a form that mention "please re-enter your password for additional security" may trigger higher-risk tagging; or the like.

In some embodiments, the Contextual Mapping Module may utilize a multi-step process, that may include, for example: (a) analysis of information and prior contextual mapping and prior contextual tagging, that had already been performed (e.g., manually, by human operators, or by automatic means) to elements or forms or contents of previously-mapped websites in general or to previously-mapped websites in a particular field (e.g., banking websites; online retailers; brokerage websites); (b) characterization of the methodology of automatic contextual mapping or automatic contextual tagging, that would cover or capture correctly the already-tagged or already-mapped elements from other websites or other web-pages; (c) implementation and deployment of machine-readable instructions or code, that reflects automatic process or automatic logic for carrying out the identified methodology; (d) experimental running or execution of the code on a newly-examined website that has not been part of the sample of websites (or web-pages) that were utilized in step (a) above; and (e) examining the results of the experimental run cycles, evaluation of the automatic mapping results, and fine-tuning and modification of the code to improve the process of contextual-based mapping or tagging.

Figure 1:
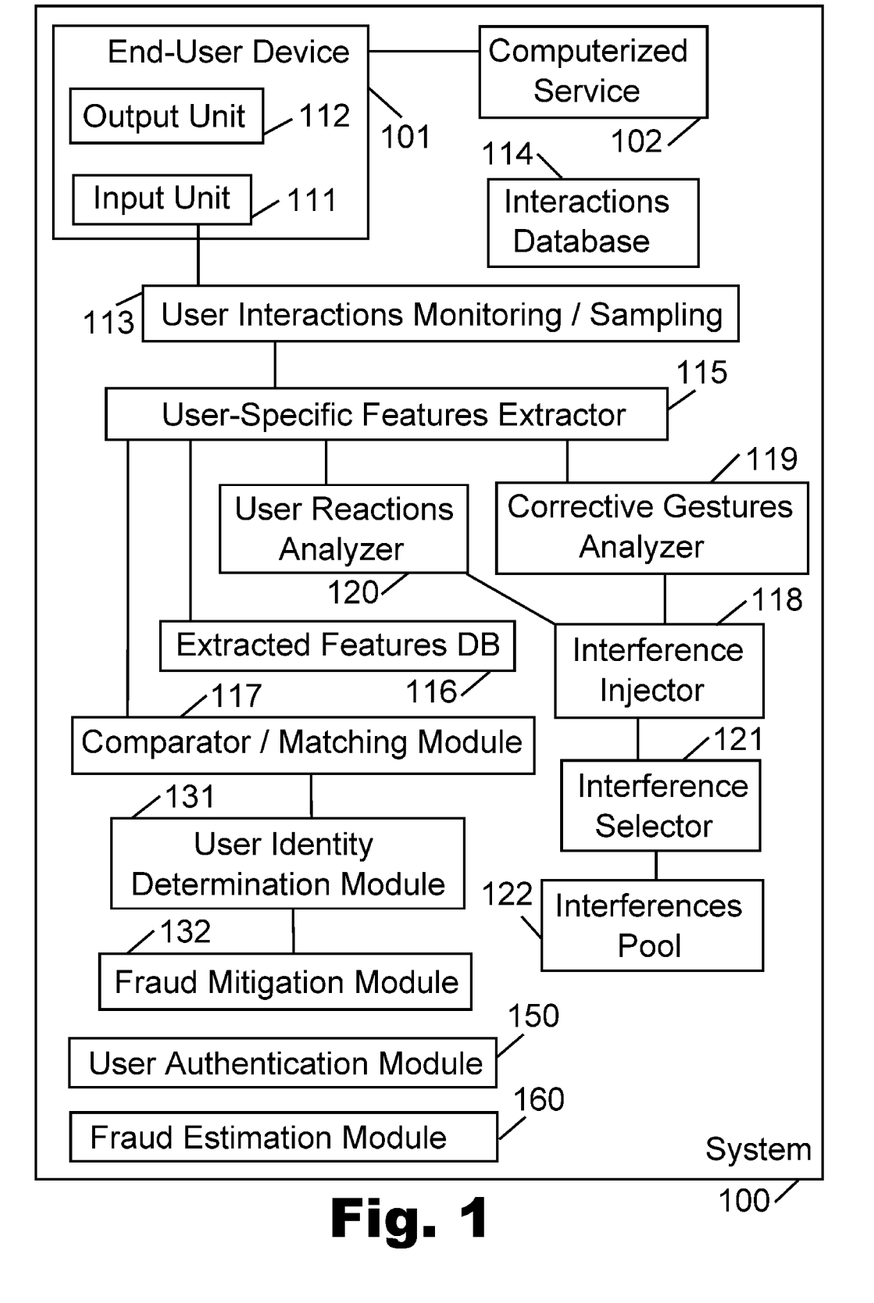
FIG. 1 is a schematic block-diagram illustration of a system, in accordance with some demonstrative embodiments of the present invention.

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a fitness bracelet (e.g., similar to FitBit or Jaw-Bone wearable devices), a wearable device, a portable device, an Augmented Reality (AR) device or glasses or helmet or headgear (e.g., similar to Google Glass), a Virtual Reality (VR) device or glasses or helmet or headgear (e.g., similar to Oculus Rift), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like. In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-user device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); particular sequences of keys or characters that the user enters more rapidly (or more slowly) relative to other characters or sequences; particular manner or pattern in which the user navigates within fields or within a page or an application; and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation, or input-output interference, or input/output anomaly) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference or anomaly or aberration. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference injector 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

System 100 may comprise a user authentication module 150 which may enable system 100 and/or computerized service 102 and/or end-user device 101 to perform user authentication, or to authenticate or verify or confirm the identity of a user of end-user device 101 (or of computerized service 102), and/or to utilize the unique behavior and/or gestures and/or reactions of the user as a user-identifying feature (e.g., which may be used by the system to authorize a log-in, or may authorize access, or may authorize a password recovery or a password reset process). The user authentication module 150 may be able to distinguish between (i) a legitimate user, or genuine user, or authorized user, or genuine account-owner; and (ii) an illegitimate user or attacker or cyber-attacker or impostor or imposter, a human attacker, a non-human attacker (e.g., a malware or automatic script or automated script or "bot") or other illegitimate user.

System 100 may comprise a fraud estimation module 160, able to estimate or detect or determine a fraud or a fraudulent transaction or a fraudulent user or an attacker or a fraudulent set-of-operations, or an attempted fraud or an attempted fraudulent transaction (which may be concurrently occurring, or which had already occurred and is now detected or estimated in retrospective review of previous operations or prior data).

Figure 2:
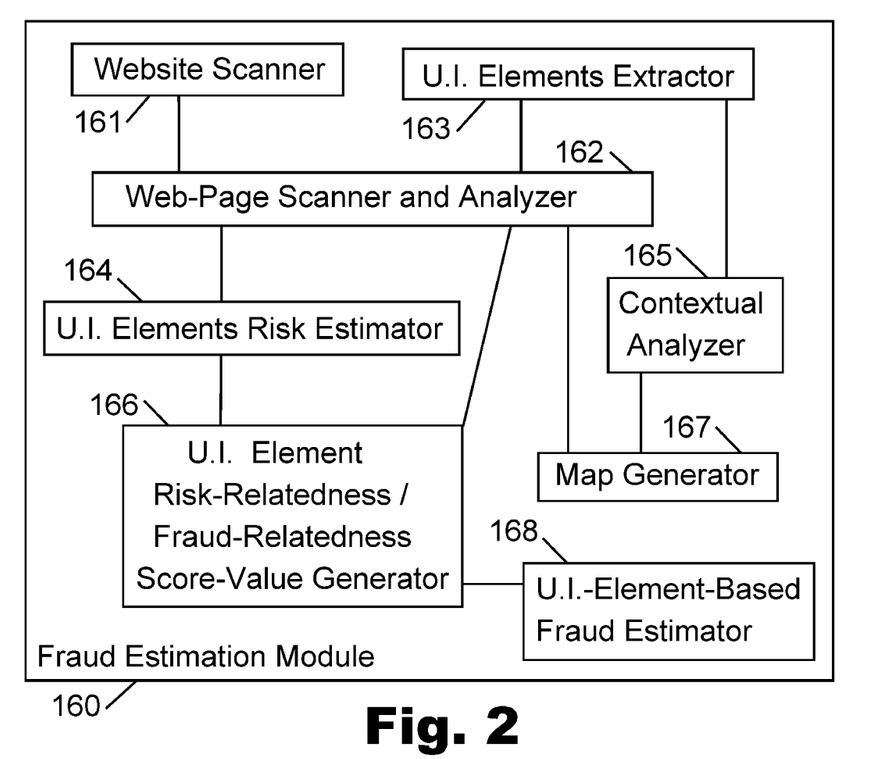
FIG. 2 is a schematic block-diagram illustration of a fraud estimation module, in accordance with some demonstrative embodiments of the present invention.

Reference is made to FIG. 2, which is a schematic block-diagram illustration of fraud estimation module 160 and its associated components, in accordance with some demonstrative embodiments of the present invention.

Fraud estimation module 160 may comprise a website scanner 161, able to scan or search or crawl or download or otherwise obtain, download and/or review an entire website (e.g., a banking website, an electronic commerce site), and able to obtain or download some or all of the web-pages of such website, or able to generate such web-pages from a dynamic script or from a source code of such website. For example, the website may be a banking website; and the website scanner 161 may crawl the entire banking website (or selected portions of the banking website), and may generate or may download a set of web-pages for further analysis. For example, the website scanner 161 may scan a banking website; and may download or generate multiple web-pages therefrom, such as, a first web-page that is used for "Contact Us", a second web-page that is used for "Find Branch Location", a third web-page that is used for "Perform Wire Transfers", a fourth web-page that is used for "See Account Details", a fifth web-page that is used for "Frequently Asked Questions", or the like.

A web-page scanner and analyzer 162 may then scan and analyze the content, data, meta-data, UI elements, GUI elements, input/output elements, links, hyperlinks, buttons, source code, and/or any other suitable data or data-items of each such web-page.

For example, a UI Elements Extractor 163 may operate in conjunction with (or as part of) the web-page scanner and analyzer 162, and may extract or identify each UI element of the web-page being analyzed; and may generate a list or a lookup table or database or other data-structure of the identified UI elements. For example, the UI Elements Extractor 163 may analyze the web-page of "Find Branch Location"; may identify each field that the user may be able to fill-out (e.g., city, zip-code), may identify each drop-down menu or radio-button or other selectable UI element (e.g., for selecting radius around a zip-code), and/or may identify any other UI elements (e.g., a "submit" or "search" button or link). Similarly, the UI Elements Extractor 163 may analyze a "Perform Wire Transfers" page; may identify a first field of "Beneficiary Name", may identify a second field of "Beneficiary Account Number", may identify a third field of "Amount to Transfer", may identify a fourth UI element of "Submit" (e.g., button for submitting the filled-out online form), or the like.

In accordance with the present invention, a UI Elements Risk Estimator 164 may estimate or determine a risk or an exposure that may be associated with each one of the identified UI elements on the web-page. Optionally, a contextual analyzer 165 or other suitable module may be utilized, for example, to perform contextual analysis, semantic analysis, content-based analysis, or other suitable analysis operations; optionally utilizing a Natural Language Processing (NLP) algorithm for analyzing the content or label that is associated with (or contained in) each such UI element; and/or optionally using a comparison or a search that utilizes pre-defined keywords or triggering words or terms. Optionally, one or more databases may be utilized or searched; for example, a database may be constructed by analyzing a log of fraudulent transactions and identifying the web-page portions or components or UI elements that fraudulent users (or attackers) typically utilize or typically engage (e.g., a "Make Payment Now" button), and conversely identifying web-page components or UI elements that fraudulent users (or attackers) typically does not utilize during a fraudulent transaction or during an attack (e.g., a "Contact Us" button, or a "Branch Locator" link); and optionally, identifying web-page elements or UI elements that are "neutral", and that are sometimes used by fraudulent users as well as by legitimate users (e.g., "Show Current Account Balance" button or link). Such database(s) may be constructed by analyzing historical, known, attacks or fraudulent transactions; and may be searched, or compared to, in order to determine whether a UI element of a current web-page is fraud-related or non-fraud-related in its typical engagement.

For example, the contextual analyzer 165 may compare a label or a content of a UI element, to a first pre-defined list of high-exposure (or high-risk) terms and/or to a second pre-defined list of low-exposure (or low-risk) terms. In a demonstrative example, the first pre-defined list of high-risk terms may include, for example: "Transfer Money", "Move Funds", "Wire Transfer", "Submit Payment"; and in contrast, the second pre-defined list of low-risk terms may include, for example: "Contact Us", "Branch Locator", "Terms of Use", "Frequently Asked Questions". Optionally, a third medium-risk or medium-exposure list of terms may be used, including terms or words or keywords which are not necessarily associated with high-risk operations, but are also not entirely benign and are not entirely low-risk; such as, for example, "Show Account Balance", "Show Recent Transactions", "Show Monthly Statement".

Based on the contextual analysis performed by the contextual analyzer 165, and/or based on other analysis performed by the UI Elements Risk Estimator 164, a UI Element Risk-Relatedness/Fraud-Relatedness Score-Value Generator 166 may generate or assign or allocate a score-value to each UI element on the web-page, indicating the risk-relatedness or the fraud-relatedness or the security-exposure that is associated with user engagement of such UI element. In a demonstrative example, each list of pre-defined terms or keywords, may further include, for each term or keyword, an associated risk-value or exposure-value, which may be used if identified in the UI element or if otherwise identified as being associated with the UI element.

In a demonstrative example, risk-value or fraud-relatedness may be a number in the range of 0 to 100, wherein 0 indicates "no risk/no exposure", and wherein 100 indicates "maximum risk/maximum exposure". For example, a UI element that is identified as including (or as being associated with, or as triggering) a "Contact Us" operation, may be assigned a fraud-relatedness value or a risk-value of zero, or a very low (e.g., single-digit) score value. Similarly, a UI element that corresponds to "Branch Locator" or to "Frequently Asked Questions", may be assigned a zero (or single-digit) risk-value or fraud-relatedness value. In contrast, a field of "Enter the Beneficiary Account Number for Wire Transfer", or a button of "Do the Wire Transfer Now", may be associated with a high risk-value or fraud-relatedness value (e.g., value of 90 or 95, out of 100). In between, medium-exposure UI elements, such as "Show Account Balance" or "Show Monthly Statement", may be assigned a medium risk-value or fraud-relatedness (e.g., value of 50 or 55, out of 100). Other suitable values and/or ranges may be used.

In some embodiments, a Map Generator 167 may generate a representation or a data-structure, such as a map, a "heat map", a lookup table, a list, a spreadsheet, a database, or other suitable data structure, to indicate the extracted UI elements in a webpage, and the risk-value or fraud-relatedness value of each one of the UI elements. For example, Table 1 demonstrates such a lookup table of UI elements of a particular single page in a banking web site:

TABLE 1

| UI Element | Risk Relatedness or Fraud Relatedness |
|---|---|
| "Contact Us" button or link | 4 |
| "Branch Locator" button or link | 2 |
| "F.A.Q." button or link | 1 |
| "Show Account Balance" button or link | 49 |
| "Show Monthly Statement" button or link | 47 |
| "Perform Payment to Payee" button or link | 51 |
| "Define New Payee" button or link | 90 |
| "Perform Money Transfer" button or link | 89 |
| "Beneficiary Name" field | 92 |
| "Beneficiary Account Number" field | 87 |
| "Amount to Wire" field | 85 |
| "Send Email Confirmation" yes/no selector | 88 |
| "Submit Payment Now" button | 96 |
| "Wire the Funds Now" button | 98 |

In accordance with the present invention, a UI-Element-Based Fraud Estimator 168 may operate, in real-time as a user engages with the web-page or with UI elements, and/or in retrospect or retroactively (e.g., by reviewing and analyzing a log of previously-recorded user interactions), in order to estimate whether a particular user operation, or a set of operations, is estimated to be fraudulent, or is estimated to be associated with fraudulent behavior, or is estimated to be associated with a fraudulent user. The UI-Element-Based Fraud Estimator 168 may take into account a combination of: (i) the risk-value or fraud-relatedness value of the UI element that was engaged, and (ii) the user-specific behavioral characteristic(s) that were extracted from user interactions performed in conjunction with (or as part of) engaging that particular UI element, and/or immediately prior to engaging with that UI element (e.g., as the on-screen pointer is moved from a previous, source position, to the UI element being engaged), and/or immediately after engaging with that UI element (e.g., as the on-screen pointer is moved from that UI element to another on-screen destination). Optionally, the UI-Element-Based Fraud Estimator 168 may further take into account, for example, the user's reaction or response or remedial actions or corrective actions, that were performed (if at all performed) in reaction to an injected input-output aberration or interference or irregularity or abnormality.

In a demonstrative example, the UI-Element-Based Fraud Estimator 168 may detect that a highly-suspicious behavior has been identified in conjunction with engaging with the "Branch Locator" button; such as, that the on-screen mouse-pointer, when moving towards the "Branch Locator" button, appears to "jump" (e.g., indicating a possible Remote Access user, rather than a direct user that sits in front of a computing device), or that the mouse-pointer moves in an entirely perfect straight line (e.g., typically associated with an automatic script that moves the mouse-pointer, and not with a human user that rarely performs perfectly-linear moves). However, even though the user behavior was suspicious and appears to be fraudulent, the particular UI Element that was the subject of the user engagement is a Low Risk UI element, associated with a low (e.g., single digit) risk-value or fraud-relatedness value. Therefore, the UI-Element-Based Fraud Estimator 168 may determine that there does not exist a need to trigger a fraud alert yet.

In contrast, the UI-Element-Based Fraud Estimator 168 may detect that a partially-suspicious behavior has been identified in conjunction with engaging with the "Submit Wire Transfer Now" button; such as, that the on-screen mouse-pointer, when moving towards the "Submit Wire Transfer Now" button, appears to "jump" (e.g., indicating a possible Remote Access user, rather than a direct user that sits in front of a computing device), or that the mouse-pointer moves in an entirely perfect straight line (e.g., typically associated with an automatic script that moves the mouse-pointer, and not with a human user that rarely performs perfectly-linear moves). Accordingly, since the user behavior was suspicious or partially-suspicious, and since the subject of the user engagement is a High Risk UI element, associated with a high risk-value or high fraud-relatedness value, then the UI-Element-Based Fraud Estimator 168 may determine that there exist an immediate need to trigger a fraud alert.

In some embodiments, the fraud estimation module 160 may generate as output a binary-type determination, indicating that a particular operation, or a particular set-of-operation, or a particular transaction, or a particular engagement with one or more UI elements, is either: (I) legitimate, or (ii) fraudulent. In other embodiments, the fraud estimation module 160 may generate as output a ternary-type determination, indicating that a particular operation, or a particular set-of-operation, or a particular transaction, or a particular engagement with one or more UI elements, is either: (I) legitimate, or (ii) fraudulent, or (III) that the system does not have sufficient data in order to positively select option (I) or option (II). In still other embodiments, the fraud estimation module 160 may generate as output a fraud-probability score, indicating the estimated probability (e.g., on a scale of 0 to 100, or other suitable range of values) that a particular operation, or a particular set-of-operation, or a particular transaction, or a particular engagement with one or more UI elements, is fraudulent (or, is associated with a fraudulent transaction, or with fraudulent purposes, or with a fraudulent user). Other types of outputs or determinations or scores may be generated by the systems and methods of the present invention.

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself.

The terms "mobile device" or "mobile electronic device" as used herein may include, for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, or the like.

The term "pointing device" as used herein may include, for example, a mouse, a trackball, a pointing stick, a stylus, a joystick, a motion-sensing input device, a touch screen, a touch-pad, or the like.

The terms "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, a smartphone, a tablet, a smart-watch, and/or other suitable machines or devices.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass®); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

Some embodiments may be utilized to identify or detect a remote access attacker, or an attacker or a user that utilizes a remote access channel to access (or to attack, or to compromise) a computerized service, or an attacker or cyber-attacker or hacker or impostor or imposter or "fraudster" that poses as a genuine user or as a true owner of an account, or an automatic script or "bot" or malware. Some embodiments may be used to differentiate or distinguish among, for example, an authorized or legitimate or genuine or human user, as opposed to an illegitimate and/or unauthorized and/or impostor human attacker or human user, and/or as opposed to a "bot" or automatic script or automated script or automated program or malware.

Some embodiments may be utilized for authenticating, or confirming the identity of, a user who is already logged-in or signed-in; or conversely, a user that did not perform (or did not yet perform, or did not complete) a log-in or sign-in process; or a user that did not successfully perform a log-in or sign-in process; or a user who is interacting with a computerized service prior to signing-in or logging in (e.g., filling-out fields in an electronic commerce website as part of checking-out as a guest), or during a log-in process, or after a log-in process; or to confirm the identity of a user who is already-logged-in, or who is not-yet logged-in, or who operates a system or service that does not necessarily require or utilize a log-in process.

The term "password" as used herein may be or may comprise, for example, a password or pass-phrase or Personal Identification Number (PIN), or other data-item or secret, or other confidential data-item, which may be used for user authentication or for logging-in or sign-in of a user into an electronic device (e.g., smartphone, tablet, smartwatch, laptop computer, desktop computer) or a service (e.g., banking service or website, brokerage service or website, email account, web-mail, social network, online vendor, online merchant, electronic commerce website or application or "app"), or other data-item or string that may be used as authentication factor or authentication step (e.g., in a single-step or multiple-step authentication process), or other log-in data that may be used in order to authorized access to a privileged service and/or to a privileged location (e.g., entry into, or exit from, or passage through a gate or card-reader or turnstile), or other log-in data item that may be used in order to authorize a user to perform privileged actions (e.g., to unlock or open a device or a vehicle; to start or ignite a vehicle; to drive a vehicle).

The terms "service" or "computerized service", as used herein, may be or may comprise any suitable service, or system, or device, which may require user authentication in order to authorize user access to it, or in order to authorize performance of one or more particular actions; including, but not limited to, for example, user authentication for accessing or operating or unlocking an electronic device (e.g., smartphone, tablet, smart-watch, laptop computer, desktop computer, smart-home device or appliance, Internet of Things (IoT) device) or service (e.g., banking service or website, brokerage service or website, email account, webmail, social network, online vendor, online merchant, electronic commerce website or application or "app"), or other system or platform that requires user authentication (e.g., entry into, or exit from, or passage through a gate or card-reader or turnstile; to unlock or open a device or a vehicle; to start or ignite a vehicle; to drive a vehicle).

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In accordance with some embodiments of the present invention, a method comprises: (A) analyzing a content of a web-page which comprises a plurality of User Interface (UI) elements that can be engaged by a user; (B) based on contextual analysis of said web-page, assigning a fraud-relatedness score-value to at least one UI element of said web-page.

In some embodiments, the method comprises: (a) identifying in said web-page a first UI element and a second UI element; (b) determining that the first UI element is a UI element that a fraudulent user typically engages in order to achieve a fraudulent result; (c) determining that the second UI element is a UI element that a fraudulent user typically does not engage; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a fraudulent user, would cause monetary damage to a genuine account owner associated with said web-page; (c) determining that the second UI element is a UI element that, if engaged by a fraudulent user, would not cause monetary damage; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, enables the user to purchase goods or services; (c) determining that the second UI element is a UI element that, if engaged by a fraudulent user, performs an operation other than purchase of goods or services; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, enables the user to perform an electronic payment; (c) determining that the second UI element is a UI element that, if engaged by a fraudulent user, performs an operation other than an electronic payment; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, creates a potential security risk to an administrator of said web-page; (c) determining that the second UI element is a UI element that, if engaged by a fraudulent user, does not create a potential security risk to an administrator of said web-page; (d) assigning to the first UI element a first fraud-relatedness score-value, and assigning to the second UI element a second, lower, fraud-relatedness score-value.

In some embodiments, the method comprises: generating a security-exposure map of UI elements of said web-page, by generating a first indication that user-engagement with a first particular UI element on said web-page creates a potential security risk for an administrator of said web-page, and by generating a second indication that user-engagement with a second particular UI element on said web-page does not create a potential security risk for the administrator of said web-page.

In some embodiments, the method comprises: (i) detecting that a user engages the first particular UI element on said web-page which creates a potential security risk for an administrator of said web-page; (ii) in response to said detecting of step (i), generating a possible-fraud notification.

In some embodiments, the method comprises: (i) detecting that a user engages the first particular UI element on said web-page which creates a potential security risk for an administrator of said web-page; (ii) extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, the method comprises: (i) detecting that a user engages the first particular UI element on said web-page which creates a potential security risk for an administrator of said web-page; (ii) injecting an input-output aberration to said web-page; monitoring user interactions in response to said input-output aberration; and extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, the method comprises: generating a fraud-exposure map of UI elements of said web-page, by generating a first indication that user-engagement with a first particular UI element on said web-page creates a potential fraud risk for an administrator of said web-page, and by generating a second indication that user-engagement with a second particular UI element on said web-page does not create a potential fraud risk for the administrator of said web-page.

In some embodiments, the method comprises: (i) detecting that a user engages the first particular UI element on said web-page which creates a potential fraud risk for an administrator of said web-page; (ii) extracting from monitored input-output interactions of said user, a user-specific behavioral characteristic that indicates that said user is possibly attempting to perform a fraudulent operation; (iii) in response to cumulative detections of step (i) and step (ii),generating a possible-fraud notification.

In some embodiments, the method comprises: (i) detecting that a user engages the first particular UI element on said web-page which creates a potential fraud risk for an administrator of said web-page; (ii) injecting an input-output aberration to said web-page; monitoring user interactions in response to said input-output aberration; and extracting from monitored input-output interactions of said user, a user-specific behavioral characteristic that indicates that said user is possibly attempting to perform a fraudulent operation; (iii) in response to cumulative detections of step (i) and step (ii),generating a possible-fraud notification.

In some embodiments, said web-page is an HTML-based page that is accessible through a web browser.

In some embodiments, said web-page is a component of a native mobile application.

In some embodiments, a system comprises: a web-page analyzer to analyze a content of a web-page which comprises a plurality of User Interface (UI) elements that can be engaged by a user; a contextual analysis module to perform contextual analysis of said web-page; a fraud-relatedness score-value generator, to generate a fraud-relatedness score-value to at least one UI element of said web-page; wherein the web-page analyzer is: (a) to identify in said web-page a first UI element and a second UI element; (b) to determine that the first UI element is a UI element that a fraudulent user typically engages in order to achieve a fraudulent result; (c) to determine that the second UI element is a UI element that a fraudulent user typically does not engage; (d) to assign to the first UI element a first fraud-relatedness score-value, and to assign to the second UI element a second, lower, fraud-relatedness score-value.

In some embodiments, the system comprises: a web-page heat-map generator to generate a heat-map for said web-page, wherein the heat-map indicates which particular UI elements of said web-page are typically engaged by cyber-attackers, and which other UI elements of said web-page are typically not engaged by cyber-attackers.

In some embodiments, the system comprises: a UI-element-based fraud estimation module, to determine whether an engagement of a particular user with a particular UI element is fraudulent, based on both: (I) a fraud-related score-value that was generated for said particular UI element, and (II) user-specific characteristics that are extracted from input-unit interactions performed by said particular user in conjunction with engagement with said particular UI element.

In some embodiments, the system comprises: a UI-element-based fraud estimation module, to determine whether an engagement of a particular user with a particular UI element is fraudulent, based cumulatively on: (I) a fraud-related score-value that was generated for said particular UI element, and (II) user-specific characteristics that are extracted from input-unit interactions performed by said particular user in conjunction with engagement with said particular UI element, and (III) reaction of said particular user to an input-output aberration that is introduced to said web-page and which causes an irregularity in input-output interactions on said web-page.

Some embodiments of the present invention may comprise devices, systems, and methods of contextual mapping of web-page elements and other User Interface elements; for example, for the purpose of differentiating between fraudulent transactions and legitimate transactions, and/or for the purpose of distinguishing between a fraudulent user and a legitimate user. For example, User Interface (UI) elements of a website or webpage or application or other computerized service, are contextually analyzed. A first User Interface element is assigned a low fraud-relatedness score-value, since user engagement with the first User Interface element does not create a security risk or a monetary exposure. A second, different, User Interface element is assigned a high fraud-relatedness score-value, since user engagement with the second User Interface element creates a security risk or a monetary exposure. The fraud-relatedness score-values are taken into account, optionally together with user-specific behavioral characteristics, in order to determine whether to generate a possible-fraud notification, or as part of generating a possible-fraud score for a particular set-of-operations.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:
1. A method comprising:
(a) automatically analyzing content of a banking or retailer website, by performing:
analyzing a log of historical transactions that are known to be fraudulent;
(b) constructing a lookup table that indicates (I) that a first GUI element is typically engaged by cyber-attackers as part of cyber-attacks, and (II) that a second GUI element is typically not engaged by cyber-attackers as part of cyber-attacks;

(c) generating a security-exposure map of on-screen GUI elements of said banking or retailer website,
by generating a first indication that user-engagement with a first particular on-screen GUI element on a particular web-page of said banking or retailer website creates a potential security risk for said banking or retailer website,
and by generating a second indication that user-engagement with a second particular on-screen GUI element on said particular web-page of said banking or retailer website does not create a potential security risk for said banking or retailer website.

2. The method of claim 1,
wherein web-pages of said banking or retailer website are HTML-based pages that are accessible through a web browser.

3. The method of claim 1,
wherein web-pages of said banking or retailer website are components of a native mobile application.

4. The method of claim 1,
wherein user-engagement with the first particular on-screen GUI element comprises engagement with said first particular on-screen GUI element via an input unit selected from the group consisting of: a mouse, a touchpad, a touch-screen;
wherein user-engagement with the second particular on-screen GUI element comprises engagement with said second particular on-screen GUI element via an input unit selected from the group consisting of: a mouse, a touchpad, a touch-screen.

5. The method of claim 1,
wherein said user-engagement with the first particular on-screen GUI element comprises engagement with said first particular on-screen GUI element via an input unit of a device selected from the group consisting of: a laptop computer, a desktop computer, a tablet, a smartphone;
wherein said user-engagement with the second particular on-screen GUI element comprises engagement with said second particular on-screen GUI element via an input unit of a device selected from the group consisting of: a laptop computer, a desktop computer, a tablet, a smartphone.

6. A non-transitory storage medium having stored thereon instructions that, when performed by a process, cause the processor to perform a method comprising:
(a) automatically analyzing content of a banking or retailer website, by performing:
analyzing a log of historical transactions that are known to be fraudulent;
(b) constructing a lookup table that indicates (I) that a first GUI element is typically engaged by cyber-attackers as part of cyber-attacks, and (II) that a second GUI element is typically not engaged by cyber-attackers as part of cyber-attacks;
(c) generating a security-exposure map of on-screen GUI elements of said banking or retailer website,
by generating a first indication that user-engagement with a first particular on-screen GUI element on a particular web-page of said banking or retailer website creates a potential security risk for said banking or retailer website,
and by generating a second indication that user-engagement with a second particular on-screen GUI element on said particular web-page of said banking or retailer website does not create a potential security risk for said banking or retailer website.

7. The non-transitory storage medium of claim 6,
wherein web-pages of said banking or retailer website are HTML-based pages that are accessible through a web browser.

8. The non-transitory storage medium of claim 6,
wherein web-pages of said banking or retailer website are components of a native mobile application.

9. The non-transitory storage medium of claim 6,
wherein user-engagement with the first particular on-screen GUI element comprises engagement with said first particular on-screen GUI element via an input unit selected from the group consisting of: a mouse, a touchpad, a touch-screen;
wherein user-engagement with the second particular on-screen GUI element comprises engagement with said second particular on-screen GUI element via an input unit selected from the group consisting of: a mouse, a touchpad, a touch-screen.

10. The non-transitory storage medium of claim 6,
wherein said user-engagement with the first particular on-screen GUI element comprises engagement with said first particular on-screen GUI element via an input unit of a device selected from the group consisting of: a laptop computer, a desktop computer, a tablet, a smartphone;
wherein said user-engagement with the second particular on-screen GUI element comprises engagement with said second particular on-screen GUI element via an input unit of a device selected from the group consisting of: a laptop computer, a desktop computer, a tablet, a smartphone.

11. A system comprising:
a fraud detection and mitigation unit,
implemented by at least a processor to execute code and a memory unit to store code,
wherein the fraud detection and mitigation unit is configured to perform:
(a) automatically analyzing content of a banking or retailer website, by performing:
analyzing a log of historical transactions that are known to be fraudulent;
(b) constructing a lookup table that indicates (I) that a first GUI element is typically engaged by cyber-attackers as part of cyber-attacks, and (II) that a second GUI element is typically not engaged by cyber-attackers as part of cyber-attacks;
(c) generating a security-exposure map of on-screen GUI elements of said banking or retailer website,
by generating a first indication that user-engagement with a first particular on-screen GUI element on a particular web-page of said banking or retailer website creates a potential security risk for said banking or retailer website,
and by generating a second indication that user-engagement with a second particular on-screen GUI element on said particular web-page of said banking or retailer website does not create a potential security risk for said banking or retailer website.

12. The system of claim 11,
wherein web-pages of said banking or retailer website are HTML-based pages that are accessible through a web browser.

13. The system of claim 11,
wherein web-pages of said banking or retailer website are components of a native mobile application.

14. The system of claim 11,
wherein user-engagement with the first particular on-screen GUI element comprises engagement with said first particular on-screen GUI element via an input unit selected from the group consisting of: a mouse, a touchpad, a touch-screen;
wherein user-engagement with the second particular on-screen GUI element comprises engagement with said second particular on-screen GUI element via an input unit selected from the group consisting of: a mouse, a touchpad, a touch-screen.

15. The system of claim 11,
wherein said user-engagement with the first particular on-screen GUI element comprises engagement with said first particular on-screen GUI element via an input unit of a device selected from the group consisting of: a laptop computer, a desktop computer, a tablet, a smartphone;
wherein said user-engagement with the second particular on-screen GUI element comprises engagement with said second particular on-screen GUI element via an input unit of a device selected from the group consisting of: a laptop computer, a desktop computer, a tablet, a smartphone.

* * * * *